United States Patent [19]

Sugitani

[11] Patent Number: 4,600,927

[45] Date of Patent: Jul. 15, 1986

[54] METHOD OF PRESERVING INK JET RECORDING HEAD

[75] Inventor: Hiroshi Sugitani, Machida, Japan

[73] Assignee: Canon Kabushiki Kaisha, Tokyo, Japan

[21] Appl. No.: 714,448

[22] Filed: Mar. 21, 1985

[30] Foreign Application Priority Data

Mar. 30, 1984 [JP] Japan ................................ 59-61139

[51] Int. Cl.[4] ...................... G01D 15/18; B65B 31/02

[52] U.S. Cl. ........................................ 346/1.1; 53/79; 53/101; 346/140 R; 346/146

[58] Field of Search ................. 346/1.1, 146, 140 PD; 53/79, 86, 101, 102

[56] References Cited

U.S. PATENT DOCUMENTS 3,795,969 3/1974 Tsunoda et al. .................. 53/101 X 3,832,824 9/1974 Burrell ................................ 53/86 X 3,933,186 1/1976 Scheffler ............................ 53/86 X

*Primary Examiner*—George H. Miller, Jr.

*Attorney, Agent, or Firm*—Fitzpatrick, Cella, Harper & Scinto

[57] ABSTRACT

A method of preserving an ink jet recording head comprises an ejecting element for flying ink droplets, an elastic ink tank portion containing an ink to be fed to the ejecting element, a casing housing the ink tank portion, and the feature is composed of housing the ink jet recording head in a preserving container, elevating the gas pressure in the preserving container to a pressure higher than atmospheric pressure, and keeping the pressurized state. An ink jet recording head is housed in the preserving container and the pressure in the container is higher than atmospheric pressure.

17 Claims, 5 Drawing Figures

METHOD OF PRESERVING INK JET RECORDING HEAD

BACKGROUND OF THE INVENTION

1. Field of the Invention

This invention relates to an improved method of preserving an ink jet recording head.

2. Description of the Prior Art

Ink jet recording heads are constructed, for example, in such a manner as shown in FIG. 1 and have an ejecting element 1 to eject flying ink droplets, an elastic ink tank 2 storing ink 100 and communicated with ejecting element 1, and a casing 3 housing and holding the ink tank 2. 4 is an ink ejection pressure generating element and 5 is an electric signal wire to element 4. Ink 100 in tank 2 is ejected in droplet form through an ink flow path 6 in ejecting element 1 by the ejection pressure of element 4. 7 is an ink ejecting port of element 1 and 8 is ink leaking from element 1.

Recording heads of this type are usually forwarded in such a manner that ink is filled in the whole portion of the head, and in such a case, the head is usually preserved in atmosphere, and therefore, there often occurs an accident that vibration and change of atmospheric pressure and temperature during transportation cause leaks of the ink from the ejecting port and the ink thus leaked becomes dry to and clogs the nozzle ejection port, resulting in inferior heads. In order to prevent such accident, it is necessary to pack the recording head firmly and use a cushion for absorbing vibration during transportation.

SUMMARY OF THE INVENTION

An object of the present invention is to provide a method of preserving an ink jet recording head free from the above-mentioned drawbacks.

Another object of the present invention is to provide a method of preserving an ink jet recording head by which the distribution form is simple, that is, the package forwarding form is simplified, resulting in lowering the cost.

A further object of the present invention is to provide a method of preserving an ink jet recording head which can prevent ink from leaking and thereby prevent ink from solidifying.

Still another object of the present invention is to provide a method of preserving an ink jet recording head by which users do not suffer from the unpleasant feeling of having the heads smeared with ink upon using the heads for the first time.

According to one aspect of the present invention, there is provided a method of preserving an ink jet recording head comprising an ejecting element for flying ink droplets, an elastic ink tank portion containing an ink to be fed to the ejecting element, a casing housing the ink tank portion, characterized by housing the ink jet recording head in a preserving container, elevating the gas pressure in the preserving container to a pressure higher than atmospheric pressure, and keeping the pressurized state.

According to another aspect of the present invention, there is provided a preserving container for ink jet recording head, characterized in that the ink jet recording head is housed in the preserving container and the pressure in the container is higher than atmospheric pressure.

DESCRIPTION OF THE PREFERRED EMBODIMENTS

Figure 1:
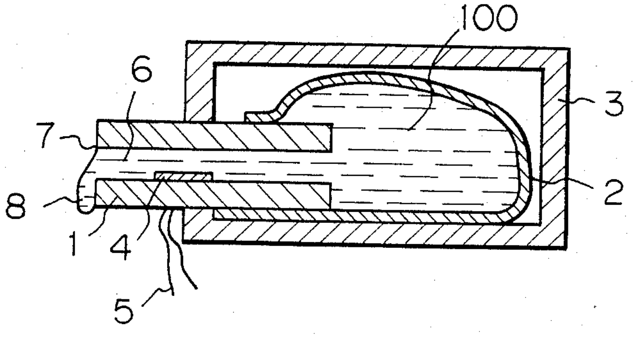
FIG. 1 is a schematic cross sectional view of a conventional ink jet recording head.

The present invention will be explained below referring to the drawing.

Figure 2:
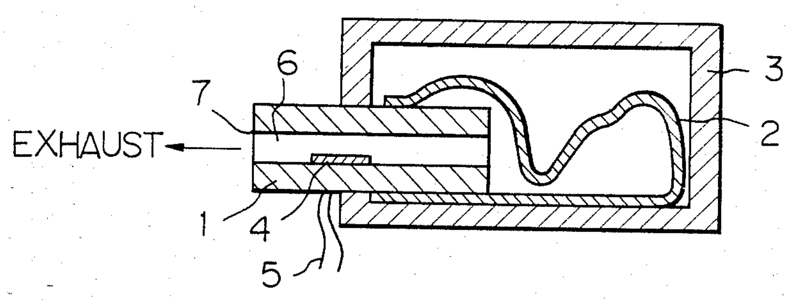
FIG. 2 to FIG. 4 are schematic cross sectional views of an embodiment of an ink jet recording head which may be used in the present invention and showing the procedure of effecting the present invention.
Figure 3:
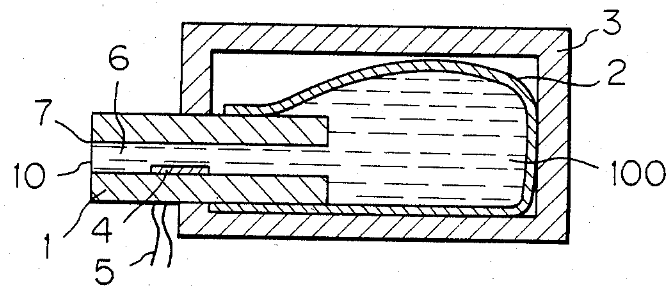
Figure 4:
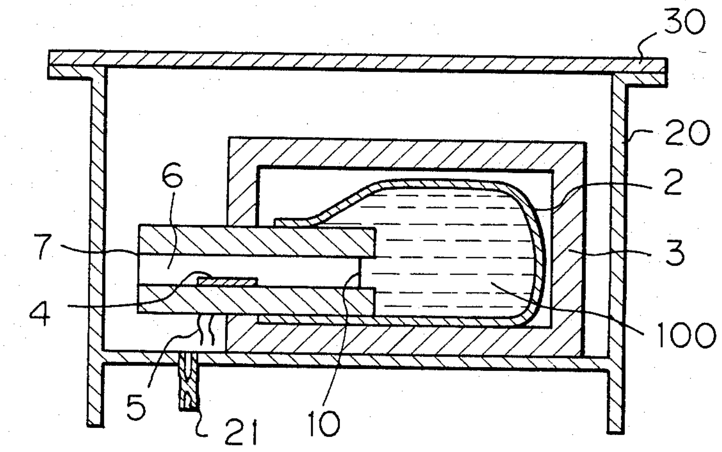

FIG. 2 to FIG. 4 are schematic cross sectional views showing an example of the preserving method according to the present invention.

According to the present invention, there may be used an ink jet recording head as shown in FIG. 1, and in the example the explanation refers to said ink jet recording head. That is, in FIG. 2, ejecting element 1 for an ink jet is connected with ink tank 2 constituted of an elastic material, and the tank 2 is housed in casing 3 composed of ABS resin.

According to the present invention, as shown in FIG. 2, ejecting port 7 or flow path 6 communicated therewith is connected with a vacuum pump (not shown) to evacuate air from ink tank 2 and ejecting element 1. Then as shown in FIG. 3, ink tank 2 and ejecting element 1 are filled with ink through ejecting port 7 or flow path 6 communicated therewith. Numeral 10 denotes the meniscus of ink.

Then, the ink jet recording head filled with ink as shown in FIG. 3 is housed in a head packing container 20 in FIG. 4 and then lid 30 is bonded to seal. A hollow communicating pipe 21 protruding outward and having a hole serving for communicating between the atmosphere and the inside of the container is provided at an appropriate position of container 20. Communicating pipe 21 is formed with a thermoplastic resin such as ABS resin and the like and can be sealed by heat. After fixing lid 30 to container 20, a gas of a pressure of 1.2 atm is fed to container 20 through communicating pipe 21, and then communicating pipe 21 is sealed. This pressure is determined taking into consideration change of temperature, change of pressure, vibration and acceleration to which ink jet heads are subjected during distribution and when the heads are transferred to users, and further the state of flow path of the ink jet, for example, cross sectional area of flow path, flow path resistance, ink viscosity, surface tension and the like. In this example, the pressure of the gas to be sealed is 1.2 atm. As a result, ink meniscus 10 formed at ejecting port 7 retreates toward ink tank 2 as shown in FIG. 4. While keeping the pressure in casing 3, communicating pipe 21 is heated to seal as shown in FIG. 4. The pressure in ink tank 2 and casing 3 is kept at 1.2 atm and meniscus 10 is kept at the state as shown in FIG. 4. Packing and forwarding are effected in this state.

As the gas filling the head packing container 20, an inert gas such as nitrogen gas and the like is preferable taking protection of electric parts into consideration. When vaporization of ink is vigorous, it is effective to incorporate a humidified nitrogen gas even though incorporating a humidified nitrogen gas is contrary to protection of electric parts. Liquid for humidifying is preferably a solvent or a vaporizing component of the ink, but other liquids will do as long as the ink is not adversely affected.

Upon using the ink jet recording head sent to users in a packed form, it is necessary only that lid 30 is peeled off from container 20 and the ink jet record head is taken out from the container. That is, opening container 20 results in returning the inside pressure to atmospheric pressure and meniscus retreated deeply in ejecting element 1 toward the ink tank by pressure returns to ejecting port 7 and the head is brought to the usable state.

Figure 5:
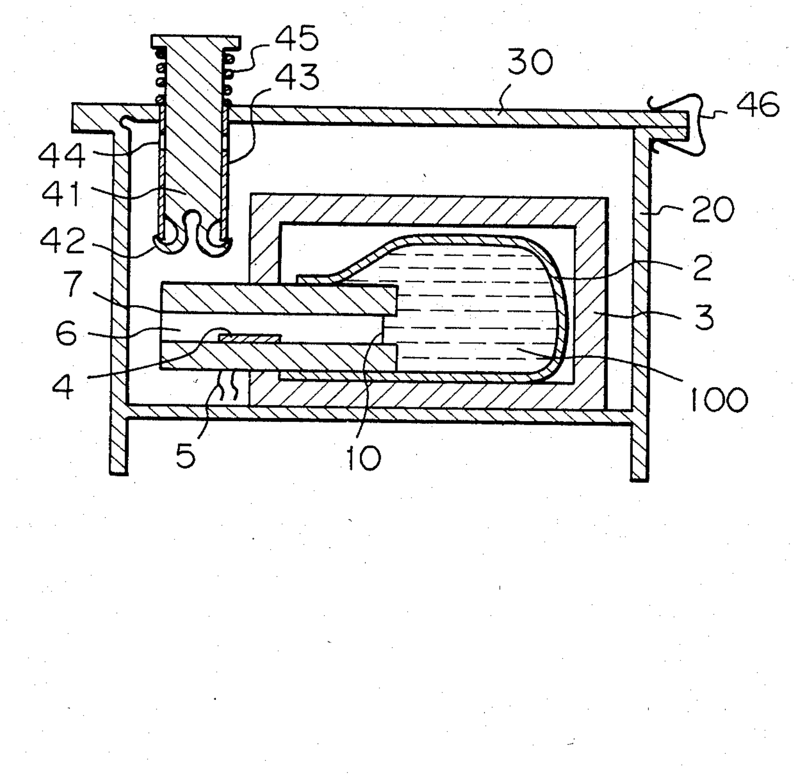
FIG. 5 is a schematic cross sectional view of another embodiment of the ink jet recording head according to the present invention.

FIG. 5 shows another embodiment of the present invention where a pressurizing means is provided to pressurize the gas in the container. In FIG. 5, 41 is a piston, 42 is a hook, 43 is a sleeve, 44 is a window formed in sleeve 43, 45 is a spring, 46 is a clip. The same numerals as those in FIG. 4 indicate the same parts as in FIG. 4.

In FIG. 5, the packing container 20 is pressurized. The pressurizing may be effected as shown below. First, the ejecting element is placed in container 20, which is then closed with lid 30, and lid 30 and the wall of container 20 are kept closely contacted by means of clip 46. Then, piston 41 is pushed down until hook 42 catches the lower end of sleeve 43. Hook 42 of piston 41 is held at the lower end of sleeve 43 and the inside of container 20 is kept at a pressurized state.

In this example, even after the container has been once opened, it can be used as a preserving container for the ejecting element. That is, hook 42 caught by the end portion of sleeve 43 is disconnected, and piston 41 is pushed upward with spring 45. Thus hook 42 is caught by window 44 of sleeve 43 to hold piston 41 at the upper position. Then, lid 30 is closed and fixed with clip 46, and then piston 41 is pushed downward in a way similar to above. Container 20 returns to a pressurized state and the ejecting element can be preserved again.

The cross sectional area and stroke of piston 41, that is, the amount of air to be pressed may be determined accordingly taking the amount of air in the container into consideration. For example, the amount of air is to be sufficient to produce the required pressure, and when preservation is effected again, the amount of air is to be such that locking can be made by hand.

As the pressurizing means, there may be used a type of using a piston as mentioned above, and further other known pressurizing means. Besides, if reuse is not necessary, pressurizing may be effected by deforming a part of the container toward the inside.

As described above, according to the present invention, packing form for distribution of ink jet recording head is simple so that the cost is lowered, and leaks of ink from the ejecting port having occurred heretofore and contamination of ink jet heads with leaked ink and the unpleasant feeling of users due to such contamination can be eliminated, and in addition, clogging of nozzle due to dryness of the leaked ink can be prevented.

I claim:

1. A method of preserving an ink jet recording head comprising an ejecting element for flying ink droplets, an elastic ink tank portion containing an ink to be fed to the ejecting element, a casing housing the ink tank portion, characterized by housing the ink jet recording head in a preserving container, elevating the gas pressure in the preserving container to a pressure higher than atmospheric pressure, and keeping the pressurized state.

2. The method according to claim 1 in which pressurizing the gas in the preserving container is effected by feeding a gas through a communicating pipe mounted on the container.

3. The method according to claim 1 in which the gas in the preserving container is an inert gas.

4. The method according to claim 3 in which the inert gas contains nitrogen gas.

5. The method according to claim 1 in which the gas in the preserving container is humidified.

6. The method according to claim 5 in which the humidifying is effected by using a solvent or a vaporizing component of the ink.

7. The method according to claim 1 in which pressurizing the gas in the preserving container is effected by a pressurizing means fixed to the container.

8. The method according to claim 7, in which the pressurizing means is a piston.

9. A preserving container for ink jet recording head, characterized in that the ink jet recording head is housed in the preserving container and the pressure in the container is higher than atmospheric pressure.

10. The preserving container according to claim 9 in which the ink jet recording head comprises an ejecting element for flying ink droplets, an elastic ink tank portion containing an ink to be fed to the ejecting element and a casing housing the ink tank portion.

11. The preserving container according to claim 9 in which the pressurizing is effected by feeding a gas through a communicating pipe fixed to the container.

12. The preserving container according to claim 9 in which the preserving container is provided with a pressurizing means for elevating the pressure to that higher than atmospheric pressure.

13. The preserving container according to claim 12 in which the pressurizing means is provided with a piston.

14. The preserving container according to claim 9 in which the gas in the preserving container in an inert gas.

15. The preserving container according to claim 14 in which the inert gas contains nitrogen gas.

16. The preserving container according to claim 9 in which the gas in the preserving container is humidified.

17. The preserving container according to claim 16 in which the humidifying is effected by using a solvent or a vaporizing component of the ink.

* * * * *